J. OAKLEY.
BROACH.
APPLICATION FILED JUNE 10, 1920.

1,366,094.

Patented Jan. 18, 1921.

WITNESS:
C. C. West.

INVENTOR.
John Oakley,
BY
Frank A. Cutter,
ATTORNEY.

UNITED STATES PATENT OFFICE.

JOHN OAKLEY, OF SPRINGFIELD, MASSACHUSETTS.

BROACH.

1,366,094.        Specification of Letters Patent.      Patented Jan. 18, 1921.

Application filed June 10, 1920. Serial No. 387,980.

*To all whom it may concern:*

Be it known that I, JOHN OAKLEY, a subject of the King of England, residing at Springfield, in the county of Hampden and State of Massachusetts, have invented a new and useful Broach, of which the following is a specification.

My invention relates to improvements in broaches having inset teeth, and resides in a construction wherein supporting means are provided in the shank for the teeth, which means are supported from the shank itself, together with such other parts and members as may be necessary or desirable in order to make the broach complete and render it serviceable in every respect, all as hereinafter set forth.

The advantages of constructing a broach with teeth that may be removed to be reground when dull, or replaced when broken, are well understood, but there has been experienced considerable difficulty in supporting such teeth in and uniting them with their shank, or the shank of the broach, in such a manner as to insure to them the necessary rigidity and exact alinement, without which it is impossible to do accurate work with the broach. The primary object of my invention is, therefore, to provide a broach having separable or removable teeth with means whereby and wherewith such teeth are held securely in perfect alinement in the shank. The means which I employ for this purpose is simple, inexpensive, and convenient.

Another object is to afford means, in a broach of the type specified, whereby removable teeth which are all of the same length, and incidentally of the same size and shape, may be used successfully. This feature renders the teeth interchangeable, which is, of course, a great advantage economically inasmuch as the teeth can be made in large quantities at a comparatively small expense, and whenever one is broken or otherwise rendered useless its replacement is a very simple matter indeed.

Other objects and advantages will appear in the course of the following description.

I attain the objects and secure the advantages of my invention by the means illustrated in the accompanying drawings, in which—

Figure 1:
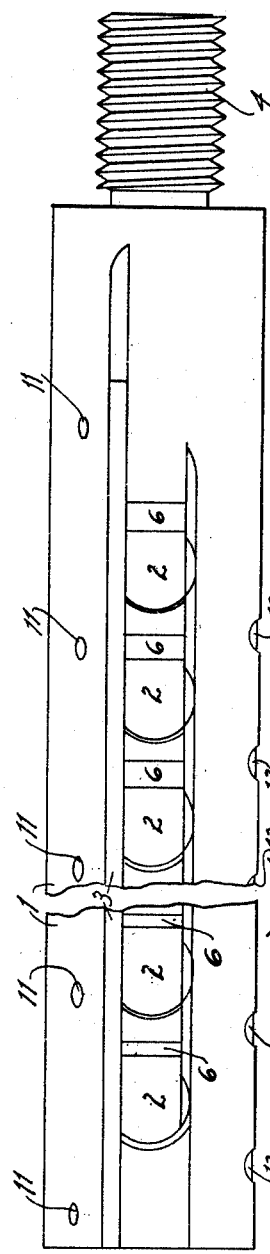
Figure 2:
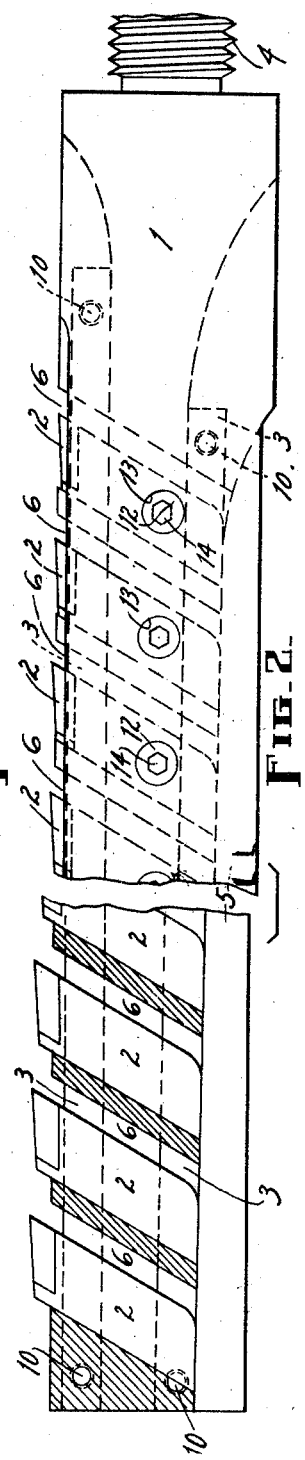
Figures 3, 4, 5, 6, 7:
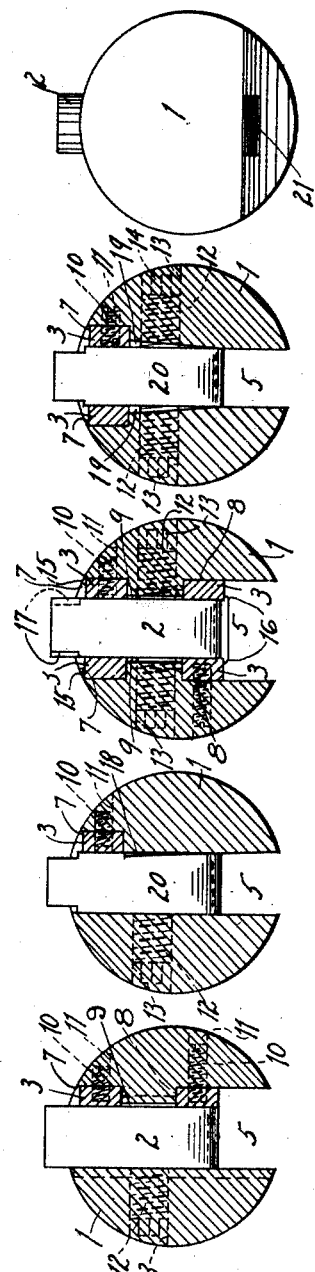

Figure 1 is a top plan of a broach, the central portion of the same being broken out, which embodies a practical form of my invention; Fig. 2, a side elevation in partial section, with the central portion broken out, of said broach; Fig. 3, a cross section through the broach, taken in front of the rearmost tooth and looking toward the left or rear; Fig. 4, a similar cross section through a broach which differs slightly in construction from the first; Fig. 5, a similar cross section showing still another modification; Fig. 6, a similar cross section showing a third modification, and, Fig. 7, a rear-end elevation of a broach which is chamfered at the bottom to form the longitudinal, chip-clearance passage.

Similar reference numerals designate similar parts throughout the several views.

Referring first to the broach illustrated in Figs. 1, 2, and 3, it will be observed that the same comprises a shank 1, a plurality of teeth 2, and upper and under, longitudinal abutment bars 3 in said shank on one side of said teeth.

The shank 1 is provided as usual with a screw-threaded puller-head 4 at the forward terminal, and has therein a longitudinal, chip-clearance passage 5, and oblique passages 6 to receive the teeth 2 and form transverse, chip-clearance passages. The passages 6 incline upwardly and forwardly from the passage 5, and open through the top of the shank 1.

Each tooth 2 is made of round stock in cross section, which is slabbed off on the front face and on top to form the cutting edges of such tooth, and also slabbed off on what may be termed the side face, which is the face that in this example bears against the bars or abutments 3.

The bars 3 are set into the shank 1 behind the teeth 2. being received in upper and lower, longitudinal recesses or slots 7 and 8, respectively, in said shank. The slot 7 opens through the top of the shank 1, so that the upper bar 3, is inserted in the slot from above, and the passages 6 open into said slot in the absence of said bar, thus enabling the teeth 2 to bear with their flat, side faces against the bar, when the latter is in place. And the slot 8 is really a continuation or enlargement of the passage 5, so that the under bar 3 is inserted in said slot from the bottom, and the passages 6 also open into this slot, in the absence of said bar, so that the teeth 2 can bear with their flat, side faces against said bar when in place, as well as against the upper bar. Preferably the side faces of the passages 6, between the bars 3, are set back a little, as represented at 9 in Fig. 3, to insure full and complete contact between the teeth 2 and said bars. The latter are also held in place by means of a plurality of screws 10, such screws being received in lateral openings 11 in the side of the shank 1, and tapped into said bars. The teeth 2 are held forcibly against the bars or abutments 3 by means of screws 12, one for each tooth. The screws 12 are tapped into lateral openings 13 in the opposite side of the shank 1, and bear at their inner ends against the convex, front side of the teeth 2, and thus force said teeth against the abutments 3 and hold the former securely in position. The screws 12 are entirely within the openings 13, and have socket heads 14 to receive the male wrench with which the screws are tightened and loosened. The bars 3 are preferably rectangular in cross section.

The bars 3 afford the stable and accurate supports necessary for the teeth 2, and the latter, when forced against said bars by the screws 12, are held in perfect alinement with each other. Upon loosening the screw 12 which holds any tooth 2 in place, such tooth can be removed without difficulty. Thus very simple and convenient means are afforded for removing and replacing any tooth, and, when the same tooth is replaced or another is substituted therefor, such tooth will be in exact alinement with the others, owing to the presence of the abutments 3.

I am able to employ teeth 2 which are all of the same length by setting them into the shank 1 farther and farther or deeper and deeper, commencing at the rear end and proceeding to the front end of said shank, being careful that the amount of projection above or beyond the shank, of any tooth, is in proper proportion to the amount of projection of the adjacent tooth or teeth. In other words, the amount of projection of each succeeding tooth, above the horizontal plane of the next preceding tooth, should be equal to the amount of projection of the latter above the horizontal plane of the tooth which precedes that, as in the case with the teeth of an ordinary broach. The teeth may or may not extend clear down to the passage 5, and they may or may not project into said passage, provided, in the event said teeth or any of them do project into the passage, they do not extend far enough into the same to clog or unduly obstruct it, so that the escape of the chips therethrough is not interfered with.

The innermost or top side of the passage 5 may be inclined so that said passage is most shallow at the front end and deepest at the rear end, the inclination of said top of said passage corresponding generally or being parallel with the inclination of a plane which touches the transverse cutting edges of the teeth 2. By thus inclining the top of the passage 5, it is possible to set in the foremost tooth as far as may be deemed necessary, without obstructing said passage seriously if at all. Then, again, the depth of the passage 5 increases from front to rear, and ample space is thus provided for the chips which increase in number with the succeeding teeth from front to rear.

As shown in Fig. 5, the broach may be provided with two pairs of upper and under bars or abutments 3, one pair on each side of the teeth 2. In this case the screws 12 which hold the teeth 2 in place are alternately arranged on opposite sides of the shank 1, so that, if the foremost tooth be held in place by means of a screw which enters from one side of the shank, the second tooth will be held by means of a screw which enters said shank from the opposite side, and so on throughout the entire length of the broach. There is here a clearance space 9 on each side of each tooth between the abutments 3 on such side. These spaces 9 are for the same purpose as in the other example.

Instead of using the screws 10 or equivalent means for holding the bars 3 in place in their slots 7 and 8, the uppermost edges of said slots 7 may be upset or turned over on to the tops of the upper bars, as at 15—15, and the bottom edges of the slots 8 may be upset or turned over on to the bottoms of the lower bars, as at 16. By thus peening the shank 1 it is possible to secure the bars 3 therein without the aid of other means. The upset parts 15 are inward extensions from circumferential portions of the shank 1, while the upset parts 16 in the main are outward extensions from the intermediate portions of said shank which are between the passages 6, being at the bottom of such portions.

In view of the fact that the teeth 2 in the second construction are held in place from opposite sides, it may be desirable to slab off the same side of each of said teeth, adjacent to the transverse cutting edge thereof, which receives the thrust from the screw 12 that holds such tooth in place. By doing this, every other tooth will cut to the same line on one side, and the intervening teeth will cut to a common line on the other side, so that a slot of the required width can be accurately cut with this broach, regardless of whatever variation there may be in the positions of the teeth due to the pressure exerted thereon by the screws 12. The cut-away portions of the teeth 2, to which reference has been made, are indicated by the numeral 17.

Except in the particulars of which special mention has been made the Fig. 5 construction is similar to that shown in the first three views.

In Fig. 4, a single abutment bar 3 is provided, and the sides of the passages 6 are utilized in place of a second abutment bar. The bar 3 herein appearing is above, while the abutment below such bar for each tooth is formed by the shank itself. A rectangular tooth 20 in cross section is used in this case. It is immaterial, so far as the present invention is concerned, whether the tooth 2 or the tooth 20 be used in any of the examples illustrated in connection herewith.

Instead of the clearance spaces 9, which are provided in each of the other two examples, a clearance space 18 is here provided for each tooth and is in the tooth itself. The space 18 permits only the lower part of the tooth 20 to contact with the side of the slot 6 in which said tooth is located, so that the latter is permitted to obtain a good bearing on the bar 3, when forced rearwardly by its screw 12. Frequently the single bar, together with the abutment afforded by the shank below said bar, will be found sufficient to retain the teeth in perfect alinement.

The tooth 20 is slabbed off on both sides adjacent to its lateral, cutting edge, but this is a detail of construction which has no particular bearing on the invention.

The Fig. 6 construction differs from the Fig. 4 construction in substantially the same manner in which the Fig. 5 construction differs from the first construction. In the Fig. 6 construction there is an abutment member 3 on each side of the tooth 20, said abutment members are supplemented by both sides of the passage 6 in each case, and screws 12 are alternately arranged as in the Fig. 5 construction. Instead of there being a clearance space, as 18, in each tooth 20 in this case, there is a clearance space 19 each side of such tooth, such spaces being wedge shape or converging at the bottom to form the lower bearings or abutments for the teeth.

The bars 3, in Figs. 4 and 6, are held in place by means of the screws 10, although they might be secured by peening, and so also might the bars 3 in the first construction.

Instead of the passage 5 being in the form of a slot in the under side of the shank 1 or which opens through one side of said shank, the corresponding side of the shank may be chamfered, as shown at 21 in Fig. 7. The chamfered part 21 of the shank 1 forms with the bore in the work the longitudinal, clearance passage for the chips, which passage to all intents and purposes is the same as the passage 5.

These broaches operate in substantially the same manner as do other broaches designed for a similar purpose. The chips cut by the teeth pass down in front of said teeth through the passages 6 into the passage 5, and escape at the rear end of said last-named passage.

More or less change in matters of shape, size, construction, and arrangement, of some or all of the parts of the broach, in addition to those which have been particularly pointed out, may be made without departing from the spirit of my invention, or exceeding the scope of what is claimed.

What I claim as my invention, and desire to secure by Letters Patent, is—

1. The combination, in a broach, with a shank having tooth-receiving passages therein, and provided with separate abutment means, of a plurality of teeth receivable in said passages, and means to force said teeth against said abutment means.

2. The combination, in a broach, with a shank having a longitudinal chip-clearance passage and transverse tooth-receiving and chip-clearance passages therein, and provided with separate abutment means, of a plurality of teeth in said transverse passages, and means to force said teeth against said abutment means.

3. The combination, in a broach, with a shank having tooth-receiving passages therein, and an abutment bar secured to said shank along one side of said passages, of a plurality of teeth receivable in said passages, and means to force said teeth against said bar.

4. The combination, in a broach, with a shank having tooth-receiving passages therein, an abutment bar receivable in said shank along one side of said passages, and means to secure said bar to said shank, of a plurality of teeth receivable in said passages, and means to force said teeth against said bar.

5. The combination, in a broach, with a shank having tooth-receiving passages therein, and provided with an abutment bar which is located along one side of said passages, of a plurality of teeth receivable in said passages, and means to force said teeth against said bar, clearance spaces being left between said teeth and said shank adjacent to said bar.

6. The combination, in a broach, with a shank having tooth-receiving passages therein, and provided with separate abutment means, of a plurality of teeth in said passages, and screws tapped into said shank to force said teeth against said abutment means.

7. The combination, in a broach, with a shank having tooth-receiving passages therein, and provided with abutment bars receivable in said shank from opposite directions, and extending along one side of said passages, of a plurality of teeth in said passages, and means to force said teeth against said bars, there being a clearance space between said teeth and said shank adjacent to said bars.

8. The combination, in a broach, with a shank having tooth-receiving passages therein, upper and under abutment bars located in said shank on both sides of said passages, and means to secure said bars to said shank, of a plurality of teeth receivable in said passages, and means to force said teeth alternately and from opposite sides against said bars.

9. The combination, in a broach, with a shank having therein a longitudinal passage which opens through one side of the shank, and lateral tooth-receiving passages which open at one end into said first-named passage, and at the other end through the opposite side of the shank, and of teeth receivable in said lateral passages, said teeth being all of the same length, and means to secure said teeth in place in said passages.

JOHN OAKLEY.

Witnesses:
F. A. CUTTER,
ARTHUR A. BETH.